(12) United States Patent
Maruyama et al.

(10) Patent No.: US 8,096,611 B2
(45) Date of Patent: Jan. 17, 2012

(54) VEHICLE FRONT-PART STRUCTURE

(75) Inventors: Hiroto Maruyama, Toyota (JP); Kazuhiro Seki, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 185 days.

(21) Appl. No.: 11/883,629

(22) PCT Filed: Feb. 1, 2006

(86) PCT No.: PCT/JP2006/002103
§ 371 (c)(1),
(2), (4) Date: Aug. 3, 2007

(87) PCT Pub. No.: WO2006/082991
PCT Pub. Date: Aug. 10, 2006

(65) Prior Publication Data
US 2008/0191518 A1 Aug. 14, 2008

(30) Foreign Application Priority Data
Feb. 4, 2005 (JP) ................................ 2005-029674

(51) Int. Cl.
*B62D 25/12* (2006.01)
(52) U.S. Cl. ......... 296/203.02; 296/193.11; 296/187.03; 296/187.09; 180/69.2; 180/69.21
(58) Field of Classification Search ................. 296/192, 296/193.11, 203.01, 203.02, 187.03, 187.09; 180/69.2, 69.21
See application file for complete search history.

(56) References Cited

U.S. PATENT DOCUMENTS

| | | | | |
|---|---|---|---|---|
| 3,709,316 A * | 1/1973 | Glance | ........................ | 180/69.21 |
| 4,186,476 A * | 2/1980 | Mair et al. | .................... | 29/407.1 |
| 5,324,133 A | 6/1994 | Kreis et al. | | |
| 5,605,371 A * | 2/1997 | Borchelt et al. | ......... | 296/187.09 |
| 6,612,644 B2 * | 9/2003 | Ahn | ......................... | 296/187.04 |
| 6,921,126 B2 * | 7/2005 | Suh et al. | ........................ | 296/192 |
| 7,052,079 B2 * | 5/2006 | Endo et al. | ............... | 296/193.11 |
| 7,055,894 B2 * | 6/2006 | Ikeda et al. | ............... | 296/187.09 |
| 7,316,448 B2 * | 1/2008 | Koyama et al. | ................ | 296/192 |
| 7,331,413 B2 * | 2/2008 | Okai et al. | .................... | 180/68.4 |
| 2002/0033286 A1 | 3/2002 | Brogly et al. | | |
| 2006/0071508 A1 * | 4/2006 | Kim | ........................ | 296/187.09 |

FOREIGN PATENT DOCUMENTS

| | | |
|---|---|---|
| DE | 41 17 233 A1 | 12/1991 |
| JP | 58-211974 | 12/1983 |
| JP | 2001-219869 | 8/2001 |

* cited by examiner

*Primary Examiner* — Glenn Dayoan
*Assistant Examiner* — Pinel Romain
(74) *Attorney, Agent, or Firm* — Finnegan, Henderson, Farabow, Garrett & Dunner, LLP

(57) ABSTRACT

A vehicle front-part structure comprises a radiator support upper (5) which extends in a vehicle width direction in a vehicle front, a cowl (9) which is coupled to an apron upper member (2) provided on a side in the vehicle width direction and extending in a vehicle lengthwise direction, and which is located to rearward of the vehicle (1) further than the radiator support upper, and a hood framework (21) which constitutes a part of the hood inner panel (17). The hood framework extends in the vehicle lengthwise direction, the hood framework is disposed between the radiator support upper and the cowl such that at least a part of a front end-face (21*a*) faces the radiator support upper and at least a part of a rear end-face (21*b*) faces the cowl.

8 Claims, 9 Drawing Sheets

FIG.5A
FIG.5B
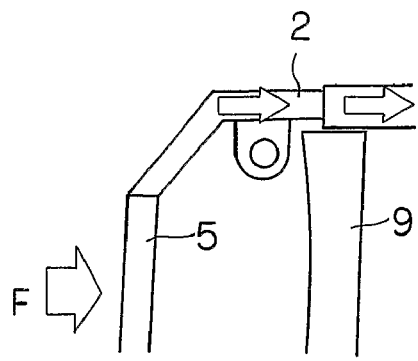
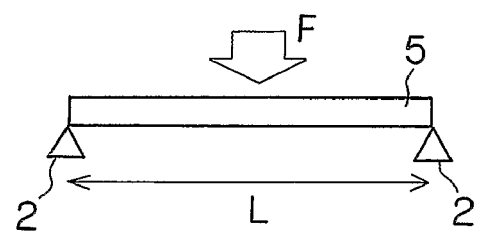
FIG.5C
FIG.5D
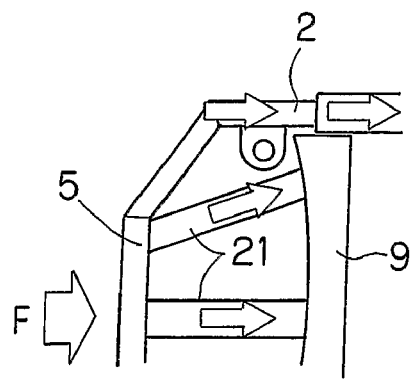
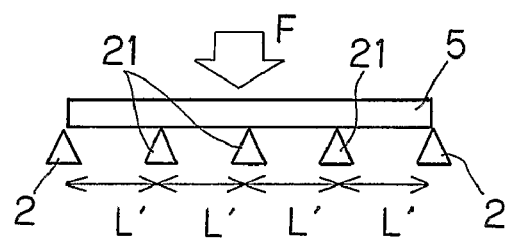

VEHICLE FRONT-PART STRUCTURE

TECHNICAL FIELD

The present invention relates to a vehicle front-part structure.

BACKGROUND ART

Conventionally, in some of the vehicle front-part structures, projection portions projected toward the outside in a vehicle width direction are provided on a radiator support sides that support both sides of a radiator, a front bumper reinforcement is attached through crash boxes onto vehicle front sides of the projection portions, and front side members are coupled onto vehicle rear sides of the projection portions. When in a slight degree of crash, a crash load is absorbed by the front bumper reinforcement and the crash boxes (Japanese Patent Application Laid-Open No. 2001-219869).

In the above vehicle front-part structure, a radiator support upper that supports the upper portion of the radiator has the structure in which the crash load cannot sufficiently be received, and a member which receives the crash load does not exist in an upper portion of a vehicle front. Therefore, a distribution of the crash load acting on the vehicle front-part is biased in a lower portion of the vehicle front where the front bumper reinforcement and the like are located, and load uniformity is lost in the vehicle front in the front crash.

DISCLOSURE OF THE INVENTION

In view of the foregoing, one object of the present invention is to provide a vehicle front-part structure which can receive the crash load in the crash even in the upper portion of the vehicle front.

To attain the above object, according to one aspect of the present invention, there is provided a vehicle front-part structure comprising: a radiator support upper which extends in a vehicle width direction in a vehicle front; a vehicle upper framework member which is coupled to an apron upper member provided on a side in the vehicle width direction and extending in a vehicle lengthwise direction, and which is located to rearward of the vehicle further than the radiator support upper; and a hood framework which constitutes a part of the hood framework member, the hood framework extending in the vehicle lengthwise direction, the hood framework being disposed between the radiator support upper and the vehicle upper framework member such that at least a part of a front end-face faces the radiator support upper and at least a part of a rear end-face faces the vehicle upper framework member.

According to the above vehicle front-part structure, when in the front crash of the vehicle, the crash load is transmitted from the radiator support upper to the vehicle upper framework member through the hood framework. Then, the crash load is transmitted from the vehicle upper framework member to the apron upper member and is further transmitted to rearward of the vehicle. Therefore, the crash load applied to the vehicle upper portion can be efficiently transmitted to rearward of the vehicle. Furthermore, in the case that an engine room is opened by operating a hood, the hood framework moves to the upside of the vehicle along with the hood, so that the hood framework does not obstruct maintenance of the engine or the like. The whole of the front end-face of the hood framework may face the radiator support upper, and the whole of the rear end-face of the hood framework may face the vehicle upper framework member. In this case, the crash load can be transmitted more securely when compared with the mode in which a part of the front end-face faces the radiator support upper and a part of the rear end-face faces the vehicle upper framework member. In the concept of the end face of the hood framework according to the present invention, there is included not only the mode in which the material exists in all the end face (for example, the end face formed by a solid-core member) but also the mode in which the material does not exist in all the end face (for example, the end face made of H-shaped or C-shaped steel, and the end face formed by a hollow member such as a pipe). Accordingly, it is sufficient that the material facing the radiator support upper and the vehicle upper framework member exist in the hood framework.

In one embodiment of the vehicle front-part structure according to the present invention, any member may be employed as the vehicle upper framework member that receives the crash load through the hood framework, as long as the member is coupled to the apron upper member with a predetermined strength. For example, the vehicle upper framework member may be a cowl extending in the vehicle width direction at a lower end of a wind shield, or may be a suspension tower. According to these embodiments, the crash load is transmitted from the radiator support upper to the cowl or the suspension tower through the hood framework, so that the crash load applied to the vehicle upper portion can be efficiently transmitted to rearward of the vehicle. The vehicle upper framework member may be a dash panel which partitions the engine room and the cabin.

In the case that the vehicle upper framework member is the suspension tower, a load transmission member may be provided between the suspension tower and a cowl extending in the vehicle width direction at a lower end of a wind shield. If the distance between the radiator support upper and the cowl is lengthened, a length of the member disposed between the radiator support upper and the cowl is increased, thereby raising the possibility that the bending moment is generated. If the bending moment is generated in the member, transmission efficiency of the crash load becomes worsened. According to the above embodiment, the crash load transmitted in the hood framework is transmitted to the cowl through the suspension tower and further thorough the load transmission member. Accordingly, the hood framework can be shortened when compared with the case in which the hood framework is disposed between the radiator support upper and the cowl, so that the generation of the bending moment is suppressed to thereby efficiently transmit the crash load to rearward of the vehicle.

In one embodiment according to the present invention, the vehicle front-part structure may comprise a front-part constraint device which has: a projection which is provided on one of the front end-face of the hood framework and the radiator support upper; and a recess which is provided on the other of the front end-face of the hood framework and the radiator support upper, and the hood framework and the radiator support upper may be able to constrain each other by accommodating the projection in the recess. According to this embodiment, the hood framework and the radiator support upper are constrained by the front-part constraint device, so that occurrence, in which relative position displacement is generated between the hood framework and the radiator support upper and these members miss each other so as to obstruct the load transmission, can be avoided when in the front crash of the vehicle. With respect to timing at which the hood framework and the radiator support upper are constrained by the front-part constraint device, it is sufficient that these members are constrained at the time of crash, and those members may also be constrained during the time except for the crash.

In one embodiment according to the present invention, the vehicle front-part structure may comprise a rear-part constraint device which has: a projection which is provided on one of the rear end-face of the hood framework and the vehicle upper framework member; and a recess which is provided on the other of the rear end-face of the hood framework and the vehicle upper framework member, and the hood framework and the vehicle upper framework member may be able to constrain each other by accommodating the projection in the recess. According to this embodiment, the hood framework and the vehicle upper framework member are constrained by the rear-part constraint device, so that occurrence, in which relative position displacement is generated between the hood framework and the vehicle upper framework member and these members miss each other to obstruct the load transmission, can be avoided when in the front crash of the vehicle. With respect to timing at which the hood framework and the vehicle upper framework member are constrained by the rear-part constraint device, it is sufficient that these members are constrained at the time of crash, and these members may also be constrained during the time except for the crash.

In one embodiment according to the present invention, the vehicle front-part structure may comprise a coupling device which has a retaining member provided on one of an intermediate portion of the hood framework and the suspension tower, and the hood framework and the suspension tower may be able to be coupled to each other by engaging the retaining member with the other of the intermediate portion of the hood framework and the suspension tower. According to this embodiment, a connection point is formed between the suspension tower and the intermediate portion of the hood framework by the retaining member. Therefore, the number of connection points between the vehicle and the hood (including hood framework) is increased, so that the generation of the bending moment can be suppressed in the hood and the hood framework to thereby efficiently transmit the crash load in the front crash.

As described above, according to the present invention, since the hood framework of which at least a part of the front end-face faces the radiator support upper while at least a part of the rear end-face faces the vehicle upper framework member is included, the crash load when in the crash can be received even in the upper portion of the vehicle front.

BRIEF DESCRIPTION OF THE DRAWINGS

FIGS. 5A to 5D are explanatory views explaining a support structure of a radiator support upper in contrast with the conventional example, wherein FIG. 5A shows a front-part structure according to a conventional example, FIG. 5B shows a support model thereof, FIG. 5C shows the first embodiment according to the present invention and FIG. 5D shows a support model thereof;

BEST MODE FOR CARRYING OUT THE INVENTION

First Embodiment

Figure 1:
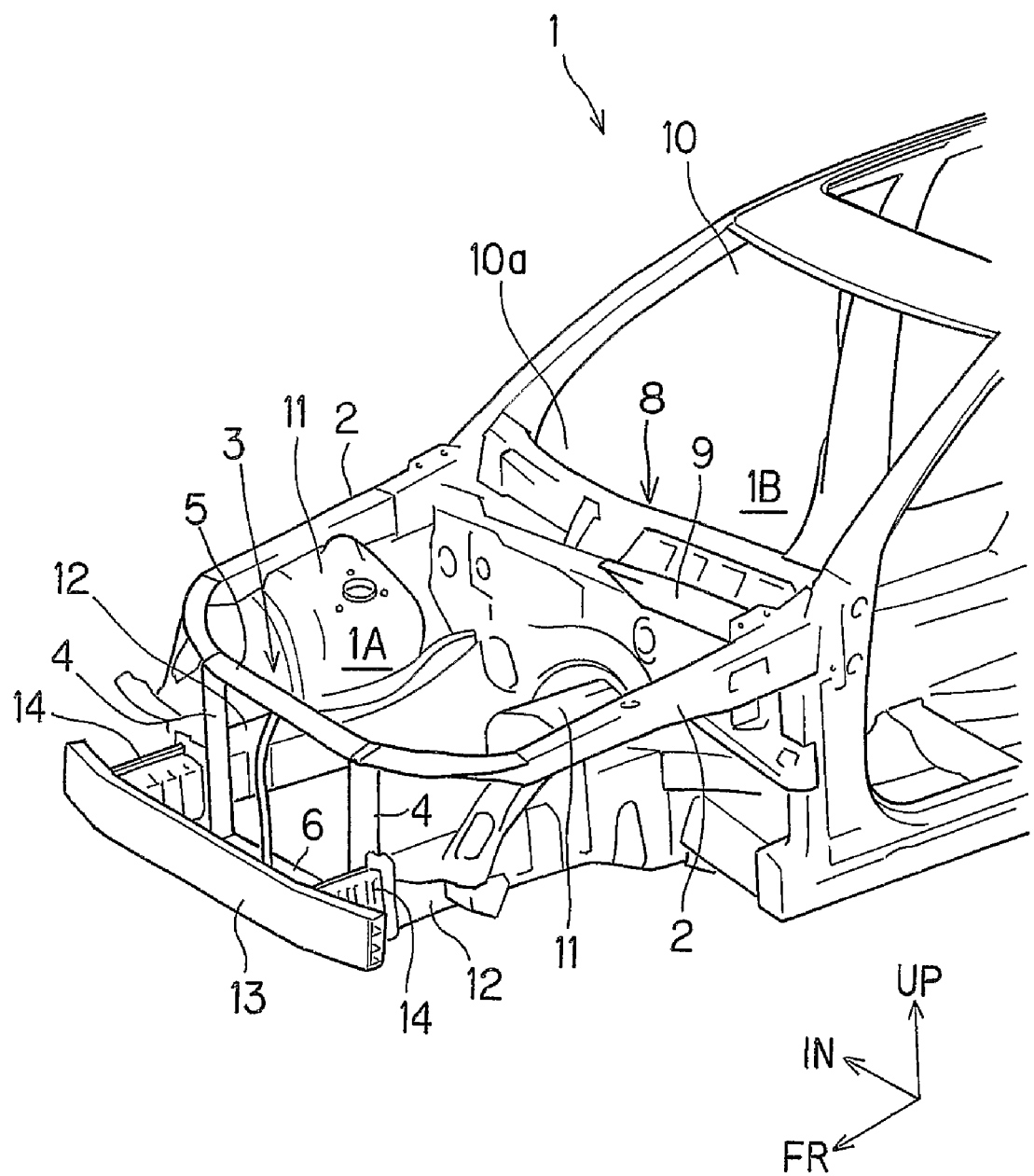
FIG. 1 is a view showing a vehicle front-part structure according to a first embodiment of the present invention while a hood is taken out.
Figure 2:
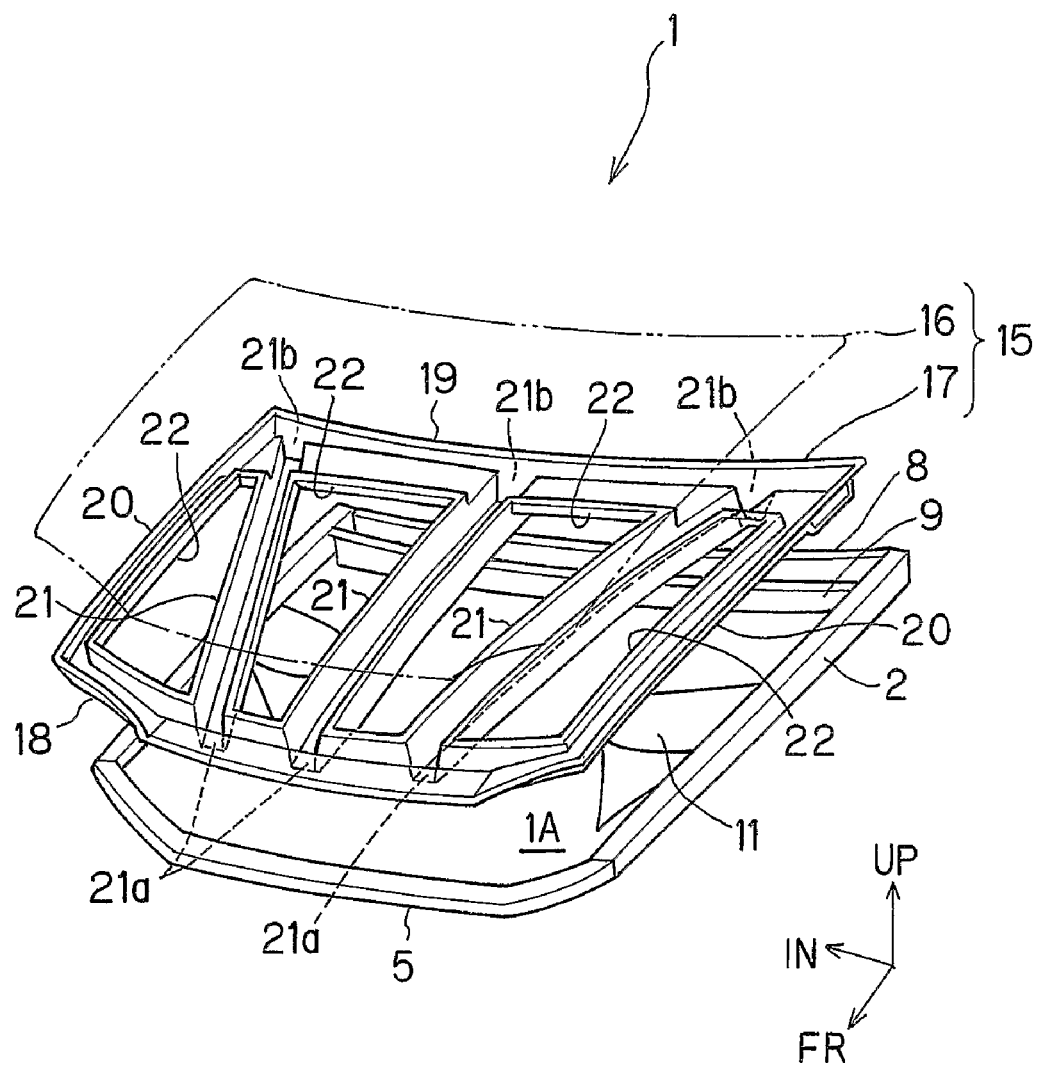
FIG. 2 is a view showing the vehicle front-part structure of FIG. 1.

FIGS. 1 and 2 show a vehicle front-part structure according to the first embodiment of the present invention, FIG. 1 shows the vehicle front-part structure of which the hood is taken out, and FIG. 2 schematically shows the vehicle front-part structure in order to facilitate understanding the same. In these figures, the sign UP denotes an upward direction of the vehicle, the sign FR denotes a frontward direction of the vehicle, and the sign IN denotes an inward direction of the vehicle (the same holds in the following drawings). As shown in FIG. 1, a vehicle 1 includes a pair of apron upper members 2 and 2 which are provided on both sides in the vehicle width direction and which extend in a vehicle lengthwise direction. To a front of the vehicle 1, there is attached a radiator support apparatus 3 including a pair of radiator support sides 4 and 4 which support a radiator (not shown) from the both sides thereof, a radiator support upper 5 which supports an upper side of the radiator, and a radiator support lower 6 which supports a lower side of the radiator. The radiator support sides 4 and 4, the radiator support upper 5, and the radiator support lower 6 are combined with each other by fastening means such as bolts (not shown) to support the radiator.

The radiator support sides 4 are connected to the apron upper members 2, respectively. A dash panel 8 which partitions an engine room 1A and a cabin 1B of the vehicle 1 is provided to the rearward of the vehicle further than the radiator support upper 5, and both sides of the dash panel 8 in the vehicle width direction are joined to the apron upper members 2 and 2 by joining means such as welding. A cowl 9 which extends in the vehicle width direction in a lower end 10a of a wind shield 10 is provided forward of the vehicle further than the dash panel 8, and both sides of the cowl 9 are joined to the apron upper members 2 and 2 by the joining means such as the welding such that the cowl 9 and the dash panel 8 are arranged side by side in the vehicle lengthwise direction. A suspension tower 11 which supports the suspension (not shown) is coupled to each apron upper member 2 in an integrally molding manner.

The vehicle 1 has a pair of front side members 12 and 12, which is of a vehicle constituting member, inside the pair of apron upper members 2 and 2 in the vehicle width direction, and a bumper reinforcement 13 is attached to the front ends of the front side members 12 and 12 through a pair of crash boxes 14 and 14.

As shown in FIG. 2, a hood 15 which opens and closes the engine room 1A is provided in the vehicle 1. The hood 15 includes a hood outer panel 16 on a surface side of the vehicle 1 and a hood inner panel 17 which is combined with the hood outer panel 16 to thereby form a framework member of the hood 15. The hood inner panel 17 includes a front portion 18 which is located on the front side of the vehicle, a rear portion 19 which is located to rearward of the vehicle, and a pair of side portions 20 and 20, each of which couples the both ends of the front portion 18 and the rear portion 19. Inside the side portions 20 and 20 in the vehicle width direction, there are extended hood frameworks 21 (three hood frameworks in FIG. 2) in the vehicle lengthwise direction to couple the front portion 18 and the rear portion 19 with each other. In the embodiment of FIG. 2, the front portion 18, the rear portion 19, each of the side portions 20 and 20, and each of the hood frameworks 21 and 21 are formed so as to be protruded toward the downward direction of the vehicle by press working of one plate-shaped member such as a steel plate. Areas surrounded by the front portion 18, the rear portion 19, each of the side portions 20, and each of the hood frameworks 21 form die-cut openings 22. However, the areas may not be subjected to die-cut and thus the openings 22 may not be provided.

Figure 3:
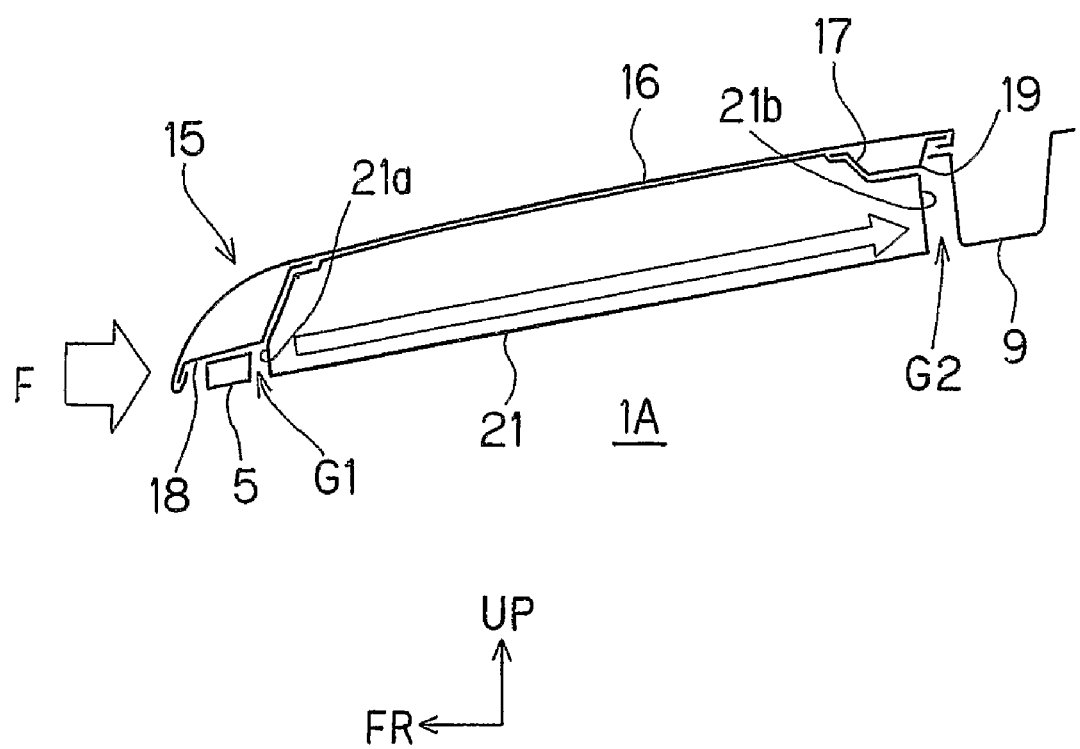
FIG. 3 is a sectional view explaining a positional relationship between each of a radiator support upper and a cowl and each component of a hood inner panel while an engine room is closed with the hood.

FIG. 3 is a sectional view explaining a positional relationship between each of the radiator support upper 5 and the cowl 9 and each of the components 18 to 21 of the hood inner panel 17 with the engine room 1A being closed by the hood 15. As shown in this figure, the hood framework 21 is formed while protruded onto the side of the engine room 1A further than each of the front portion 18 and the rear portion 19 of the hood inner panel 17.

Figure 4A:
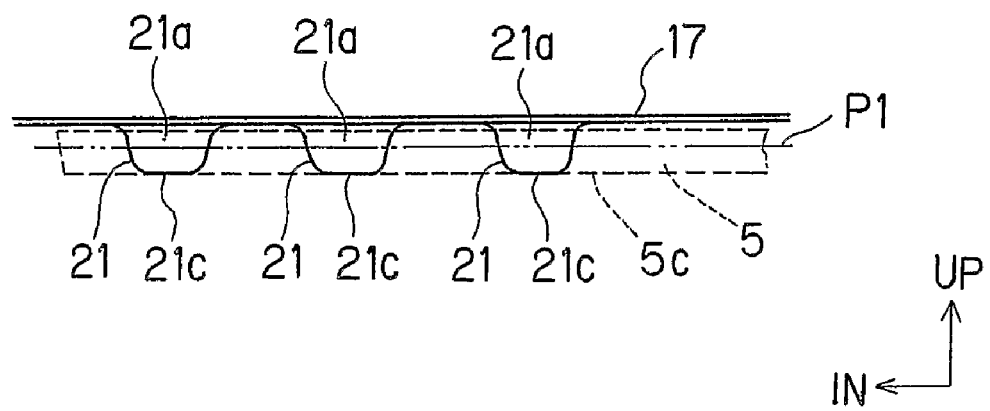
FIG. 4A is explanatory view showing a positional relationship between a front end-face of a hood framework and a radiator support upper.
Figure 4B:
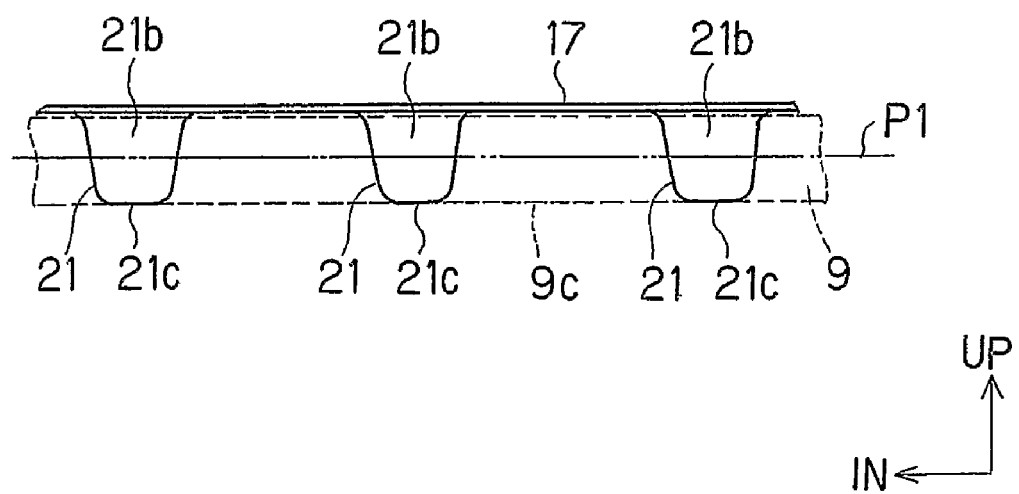
FIG. 4B is explanatory view showing a positional relationship between a rear end-face and a cowl.

As also shown in FIGS. 4A and 4B, the hood frameworks 21 are disposed between the radiator support upper 5 and the cowl 9 such that a front end-face 21a of each hood framework 21 and a rear end-face 21b thereof face the radiator support upper 5 and the cowl 9, respectively. In the first embodiment, a lower-side side-face 21c of each hood framework 21 is aligned with lower-side side-faces 5c and 9c of the radiator support upper 5 and the cowl 9, all the front end-faces 21a face the radiator support upper 5, and all the rear end-faces 21b face the cowl 9, however, the lower-side side-face 21c of each hood framework 21 may be offset to a position shown by two-dot chain lines P1 in FIGS. 4A and 4B in the upward direction of the vehicle. That is, it is sufficient that at least a part of the front end-face 21a and at least a part of the rear end-face 21b face the radiator support upper 5 and the cowl 9, respectively. In other words, when in the front crash of the vehicle 1, the radiator support upper 5 and the front end-face 21a of each hood framework 21 abut on each other, and the rear end-face 21b of each hood framework 21 and the cowl 9 abut on each other, thereby forming a transmission path of a crash load between the radiator support upper 5 and the cowl 9 through the hood frameworks 21. As shown in FIG. 3, due to restriction of the press working, it is difficult to make the end faces 21a and 21b be projected toward the outside in the vehicle lengthwise direction, so that gaps G1 and G2 are formed between the front end-face 21a of each hood framework 21 and the radiator support upper 5 and between the rear end-face 21b and the cowl 9, respectively.

Since the vehicle 1 has the above front-part structure, when the crash load is applied to the vehicle front part due to the front crash of the vehicle 1, as shown by an arrow F in FIG. 3, the crash load is transmitted onto the side of the cabin 1B (vehicle rearward side) through the radiator support upper 5, each hood framework 21, and the cowl 9. Further, as shown in FIGS. 5A to 5D, in the vehicle 1, the number of supports of the radiator support upper 5 is increased from the conventional two-point support by the apron uppers 2 to the five-point support by three points with the hood frameworks 21. Therefore, as shown by support models of FIGS. 5B and 5D, a distance L' between support points of the radiator support upper 5 is shortened when compared with the conventional example L, so that bending moment applied to the radiator support upper 5 is decreased. Accordingly, rigidity of the radiator support upper 5 can be increased to thereby generate high reaction force in the radiator support upper 5.

Further, as shown in FIG. 1, in the lower front of the vehicle, since the crash load is transmitted onto the side of the cabin 1B through the bumper reinforcement 13, the crash boxes 14, and the front side members 12, load uniformity is improved when in the front crash.

Second Embodiment

Figure 6:
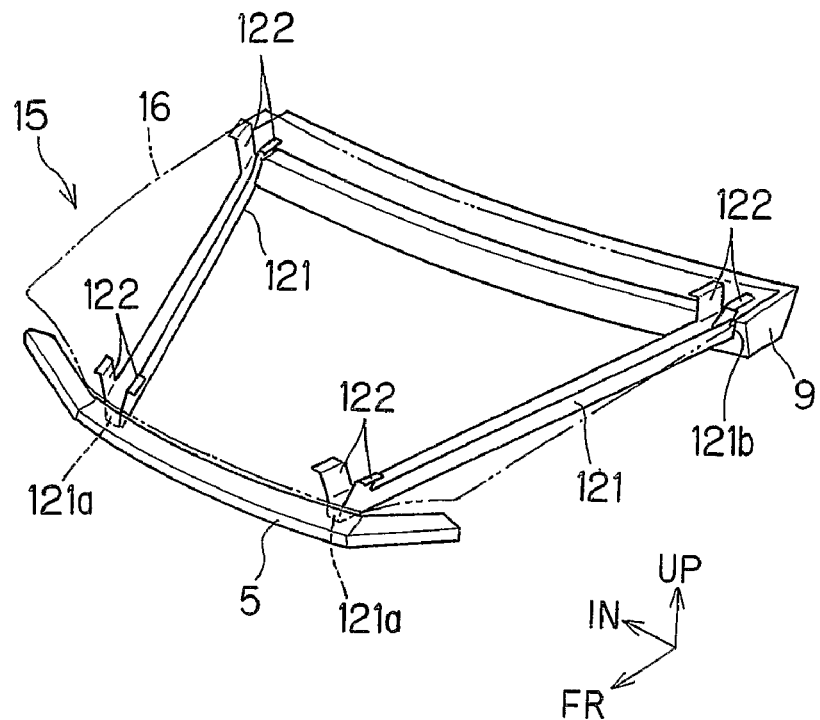
FIG. 6 is a view showing a vehicle front-part structure according to a second embodiment.
Figure 7:
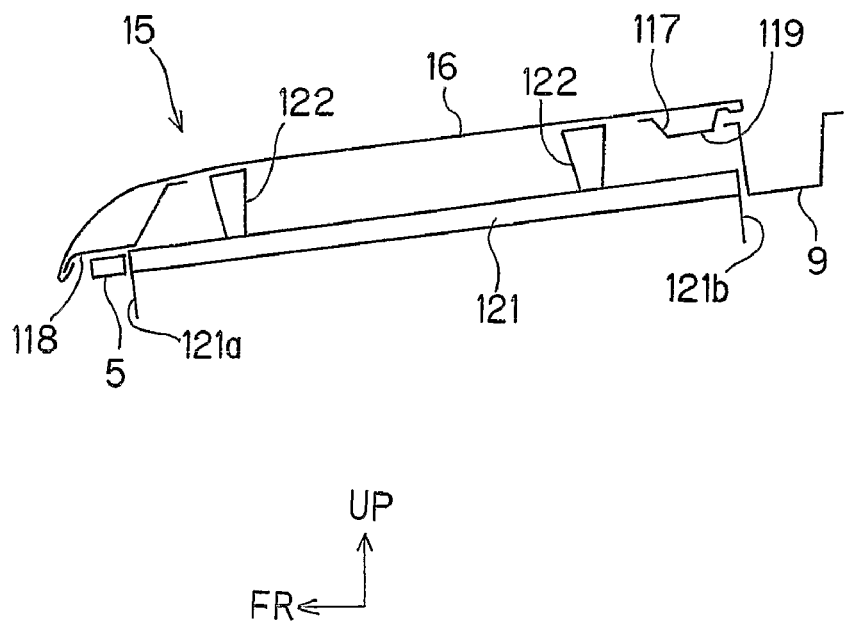
FIG. 7 is a sectional view showing the front-part structure of FIG. 6.
Figure 8:
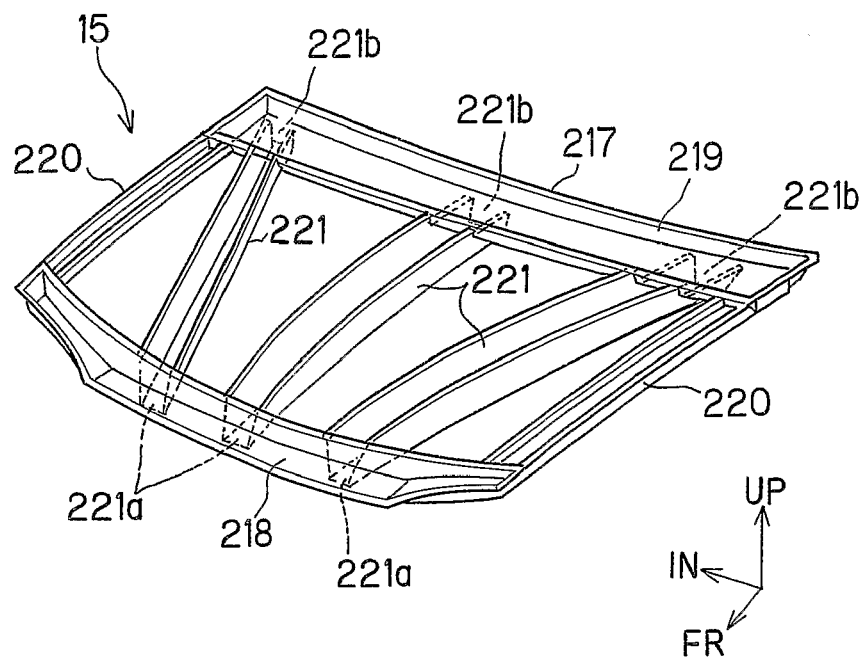
FIG. 8 is a view showing a modification of the second embodiment.
Figure 9:
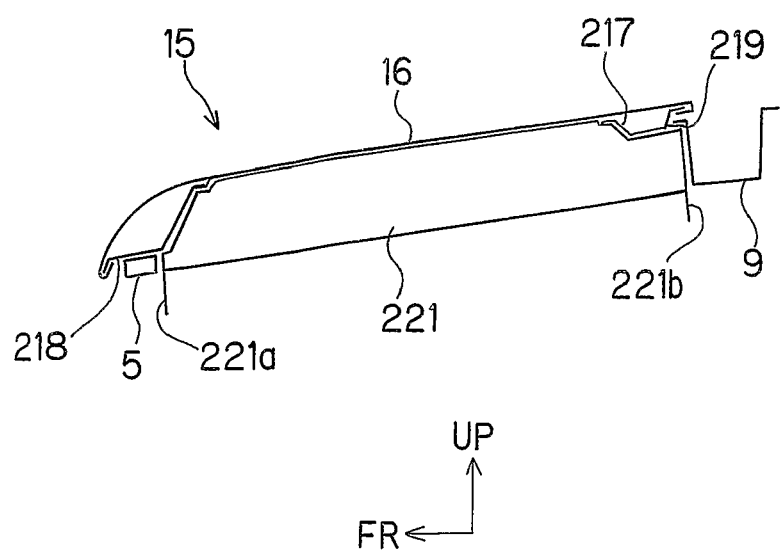
FIG. 9 is a sectional view showing the front-part structure of FIG. 8.

FIGS. 6 and 7 show the second embodiment according to the present invention. In these figures, the same component as that in the first embodiment is denoted by the same reference numeral, and the description thereof will be omitted. In this embodiment, hood frameworks 121 are provided so as to be suspended from a hood inner panel 117. A front portion 118, a rear portion 119, and side portions (not shown) of the hood inner panel 117 are integrally formed by the press working, and each hood framework 121 is joined to the hood inner panel 171 through hanging members 122 by the joining means such as the welding. Since each hood framework 121 is provided in the above embodiment, a degree of freedom is increased in design of each hood framework with no influence of the restriction in the press working, end faces 121a and 121b of each hood framework 121 can be projected toward the outside in the vehicle lengthwise direction. Accordingly, the gaps G1 and G2 (see FIG. 3) to be generated between the radiator support upper 5 and the cowl 9 in the first embodiment can be decreased. Therefore, the load transmission through each hood framework 121 becomes faster and more securely when in the front crash of the vehicle. In a modification of the second embodiment, as shown in FIGS. 8 and 9, hood frameworks 221 may be joined to a hood inner panel 217, in which a front portion 218, a rear portion 219, and side portions 220 are integrally formed, by the joining means such as the welding without using the hanging members 122. In this modification, the same effect as that in the embodiment of FIGS. 6 and 7 is exerted. In FIGS. 8 and 9, the reference numeral 221a denotes a front end-face, and the reference numeral 221b denotes a rear end-face.

Third Embodiment

Figure 10:
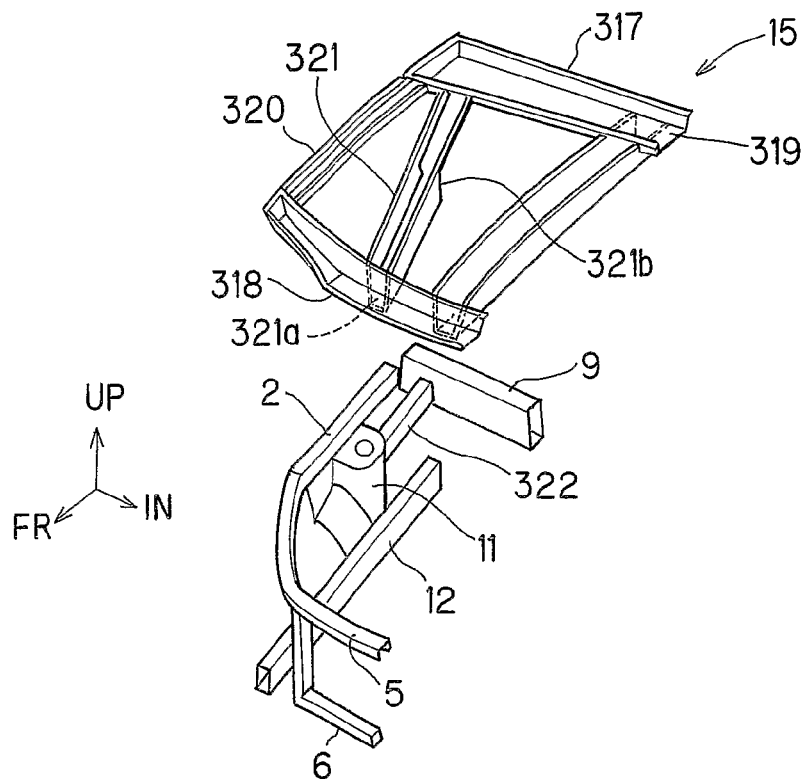
FIG. 10 is a view showing a vehicle front-part structure according to a third embodiment.
Figure 11:
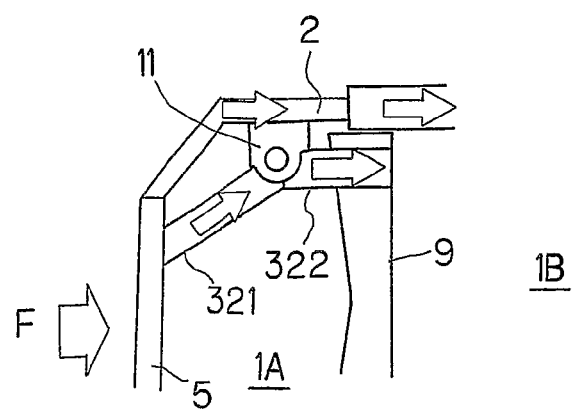
FIG. 11 is a plan view showing the front-part structure of FIG. 10.

FIGS. 10 and 11 show the third embodiment according to the present invention. In these figures, the same component as that in the first embodiment is denoted by the same reference numeral, and the description thereof will be omitted. In this embodiment, rear end-faces 321b of hood frameworks 321 (only one side is shown in FIGS. 10 and 11) on the both sides in the vehicle width direction are disposed so as to face the suspension towers 11, each of which is of the upper vehicle framework member. In this case, as shown by the arrow F in FIG. 11, when in the front crash of the vehicle 1, the crash load is transmitted from the radiator support upper 5 to each suspension tower 11 through each hood framework 321. Further in this embodiment, a load transmission member 322 may be provided between each suspension tower 11 and the cowl 9. In this case, the crash load to be transmitted through each hood framework 321 is transmitted to the cowl 9 through each suspension tower 11 and each load transmission member 322. Accordingly, each hood framework 321 can be shortened when compared with the case in which one hood framework is disposed between the radiator support upper 5 and the cowl 9. Therefore, generation of the bending moment in each hood framework 321 can be suppressed to thereby efficiently transmit the crash load onto the side of the cabin 1B. In the embodiment of FIG. 10, each hood framework 321 may be joined to a hood inner panel 317, in which a front portion 318, a rear portion 319, and side portions 320 are integrally formed, by the joining means such as the welding. However, the front portion 318, the rear portion 319, the side portions 320, and the hood frameworks 321 may be integrally formed by the press working.

Fourth Embodiment

Figure 12:
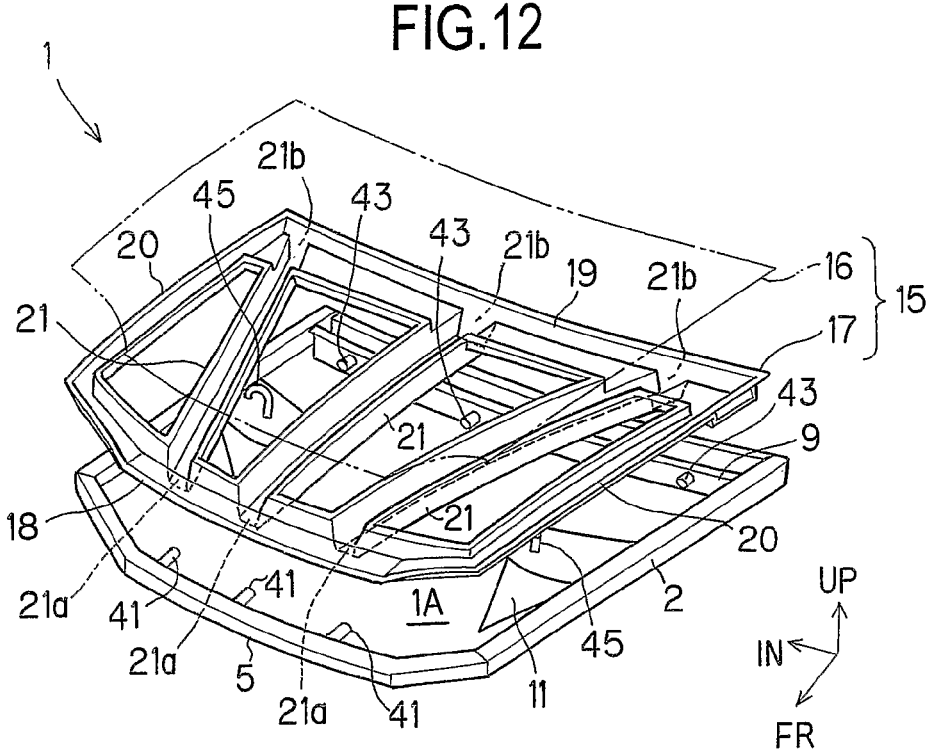
FIG. 12 is a view showing a vehicle front-part structure according to a fourth embodiment.
Figure 13:
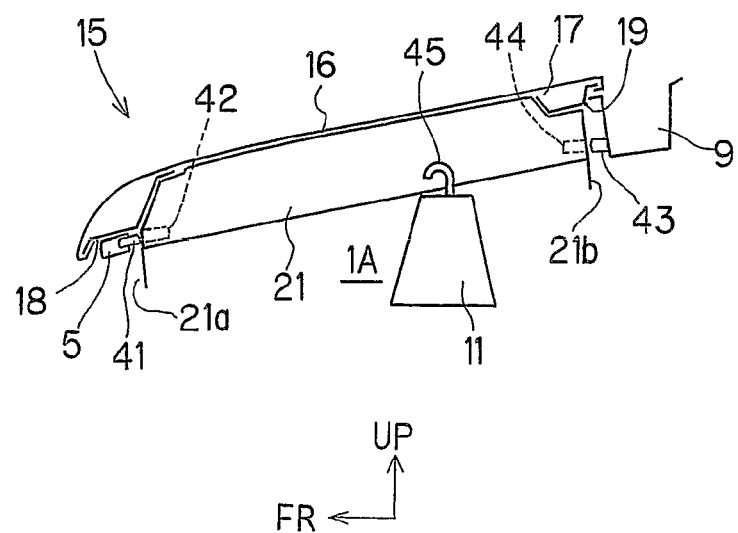
FIG. 13 is a sectional view showing the front-part structure of FIG. 12.

FIGS. 12 and 13 show the fourth embodiment according to the present invention. In these figures, the same component as that in the first embodiment is denoted by the same reference numeral, and the description thereof will be omitted. As shown in FIGS. 12 and 13, in the fourth embodiment, front-side pins (projections) 41 are provided on the radiator support upper 5, and a front-side hole (recess) 42 corresponding to each of the front-side pins 41 is provided on the front end-face 21a of each hood framework 21. Rear-side pins (projections) 43 are provided in the cowl 9, and a rear-side hole (recess) 44 corresponding to each of the rear-side pins 43 is provided on the rear end-face 21b of each hood framework 21. When in the front crash of the vehicle 1, a relative distance between the front end-face 21a of each hood framework 21 and the radiator support upper 5 and a relative distance between the rear end-face 21b of each hood framework 21 and the cowl 9 are decreased, and the front-side pins 41 and the rear-side pins 43 are received by the front-side holes 42 and the rear-side holes 44, respectively. Therefore, each hood framework 21 and the radiator support upper 5 are constrained with each other, each hood framework 21 and the cowl 9 are constrained with each other, and thus, the pins 41 and 43 and the holes 42 and 44 serve as the front-part constraint device (or means) and the rear-part constraint device (or means) of the present invention, respectively.

A hook (retaining device) 45 is provided on each suspension tower 11. When the engine room 1A is closed with the hood 15, the hook 45 is engaged with the intermediate portion of each hood framework 21 to thereby couple each hood framework 21 and each suspension tower 11, and thus, the hook 45 serves as the joining device or means of the present invention.

As described above, when in the front crash of the vehicle 1, the relative position displacement between each hood framework 21 and the radiator support upper 5 and the relative position displacement between each hood framework 21 and the cowl 9 are prevented, respectively, so that the state in which these members miss one another so as to obstruct the load transmission can be avoided. A connection point is formed between the intermediate portion of each hood framework 21 and each suspension tower 11 by the hook 45 to thereby increase the number of connection points between the vehicle 1 and the hood 15 (including each hood framework 21), so that, when in the front crash, the generation of the bending moment in the hood 15 and each hood framework 21 is to be suppressed, and thus, the crash load can efficiently be transmitted.

Each of the front-side pins 41 may be provided on the front end-face 21a of each hood framework 21, and each of the rear-side pins 43 may be provided on the rear end-face 21b of each hood framework 21. Correspondingly, the front-side holes 42 and the rear-side holes 44 may be provided on the radiator support upper 5 and the cowl 9, respectively. In the embodiment of FIG. 10 (the third embodiment), the rear-side pin 43 or the rear-side hole 44 may be provided on each suspension tower 11. The constraint of the members is not limited to a time at which the vehicle 1 crashes, but the members may be constrained during the engine room 1A is closed with the hood 15.

The invention claimed is:

1. A vehicle front-part structure comprising:
a radiator upper support member which supports an upper side of a radiator and extends in a vehicle width direction of a vehicle front portion;
a vehicle upper framework member which is coupled to apron upper members provided on both sides in the vehicle width direction and extending in a vehicle lengthwise direction, and which is located further rearward on the vehicle than the radiator upper support member and which extends in the vehicle width direction; and
a hood framework which constitutes a part of a hood framework member, the hood framework extending in the vehicle lengthwise direction, the hood framework being disposed between the radiator upper support member and the vehicle upper framework member on a lower side of a hood outer panel such that at least a part of a front end-face of the hood framework faces a part of the radiator upper support member and at least a part of a rear end-face of the hood framework faces a part of the vehicle upper framework member, the part of the vehicle upper framework member being spaced away from the apron upper members in the vehicle width direction;
wherein the part of the radiator upper support member and the front end-face of the hood framework form a first crash load transmitting gap, and the rear end-face of the hood framework and the part of the vehicle upper framework member form a second crash load transmitting gap.

2. The vehicle front-part structure according to claim 1, wherein the vehicle upper framework member is a cowl extending in the vehicle width direction at a lower end of a wind shield.

3. The vehicle front-part structure according to claim 1, comprising a front-part constraint device which has:
a projection which is provided on one of the front end-face of the hood framework and the radiator upper support member; and
a recess which is provided on the other of the front end-face of the hood framework and the radiator upper support member,
wherein the hood framework and the radiator upper support member are able to constrain each other by accommodating the projection in the recess.

4. The vehicle front-part structure according to claim 1, comprising a rear-part constraint device which has:
a projection which is provided on one of the rear end-face of the hood framework and the vehicle upper framework member; and
a recess which is provided on the other of the rear end-face of the hood framework and the vehicle upper framework member, wherein the hood framework and the vehicle upper framework member are able to constrain each other by accommodating the projection in the recess.

5. The vehicle front-part structure according to claim 1, comprising a coupling device which has a retaining member provided on one of an intermediate portion of the hood framework and a suspension tower, wherein the hood framework and the suspension tower are able to be coupled to each other by engaging the retaining member with the other of the intermediate portion of the hood framework and the suspension tower.

6. The vehicle front-part structure according to claim 1, wherein the hood framework is disposed such that at least the part of the rear end-face faces the vehicle upper framework member away from the apron upper members toward a center in the vehicle width direction.

7. The vehicle front-part structure according to claim 1, further comprising radiator upper support member sides which are combined with the radiator upper support member and which extend downwardly from both sides of the radiator upper support member, and a bumper reinforcement which is attached to front side members of vehicle constituting members and which is disposed to frontward of the vehicle further than the radiator upper support member and the radiator upper support member sides and downward further than the radiator upper support member, the bumper reinforcement extending in the vehicle width direction.

8. The vehicle front-part structure according to claim 7, wherein the bumper reinforcement is attached to the front side members through crash boxes.

* * * * *